May 28, 1968 R. D. WEBER ET AL 3,385,378
AUTOMATIC AIR OPERATED INSTALLATION GUN
Filed June 22, 1966 2 Sheets-Sheet 2
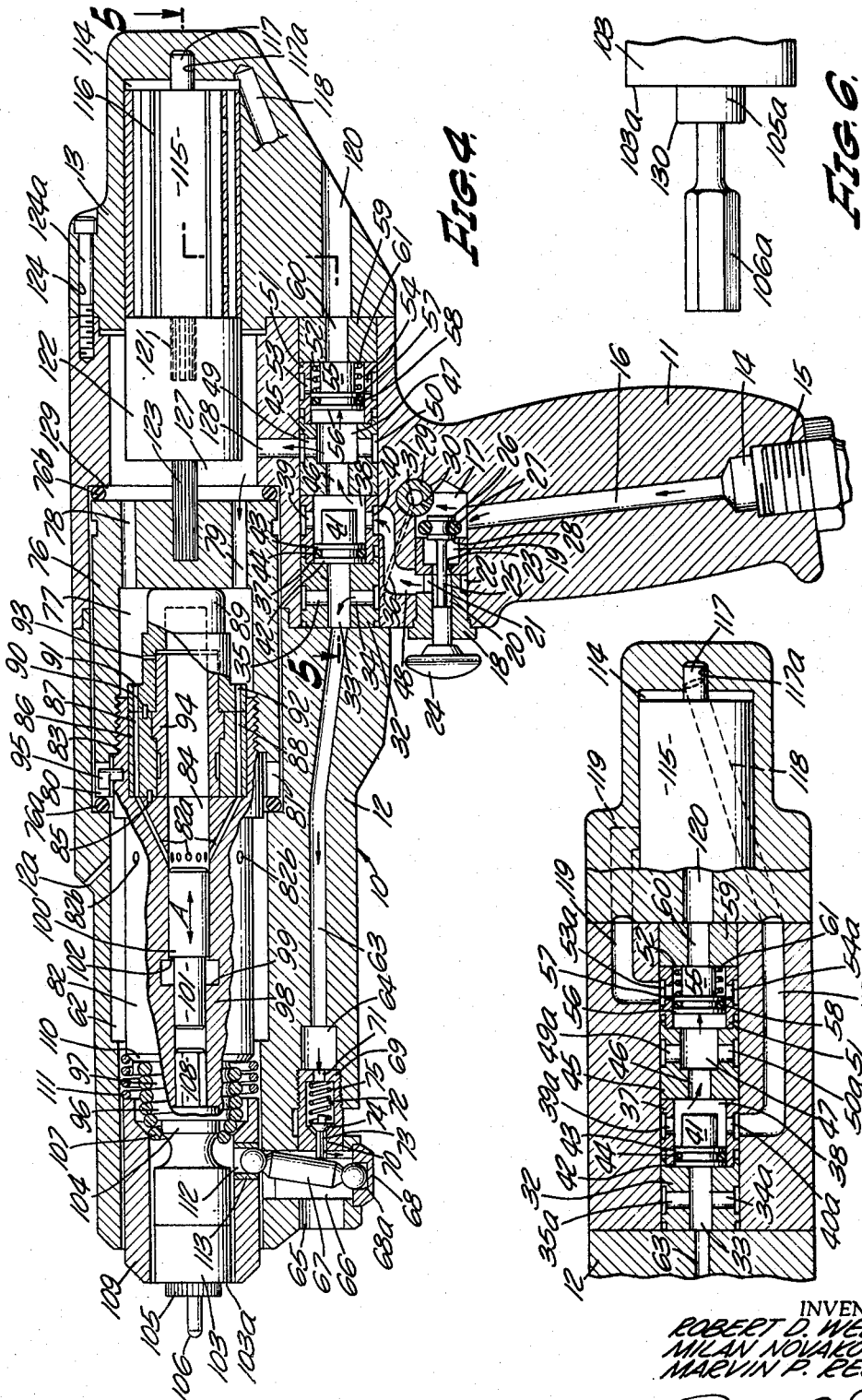
INVENTORS.
ROBERT D. WEBER
MILAN NOVAKOVICH
MARVIN P. REECE
ATTORNEY

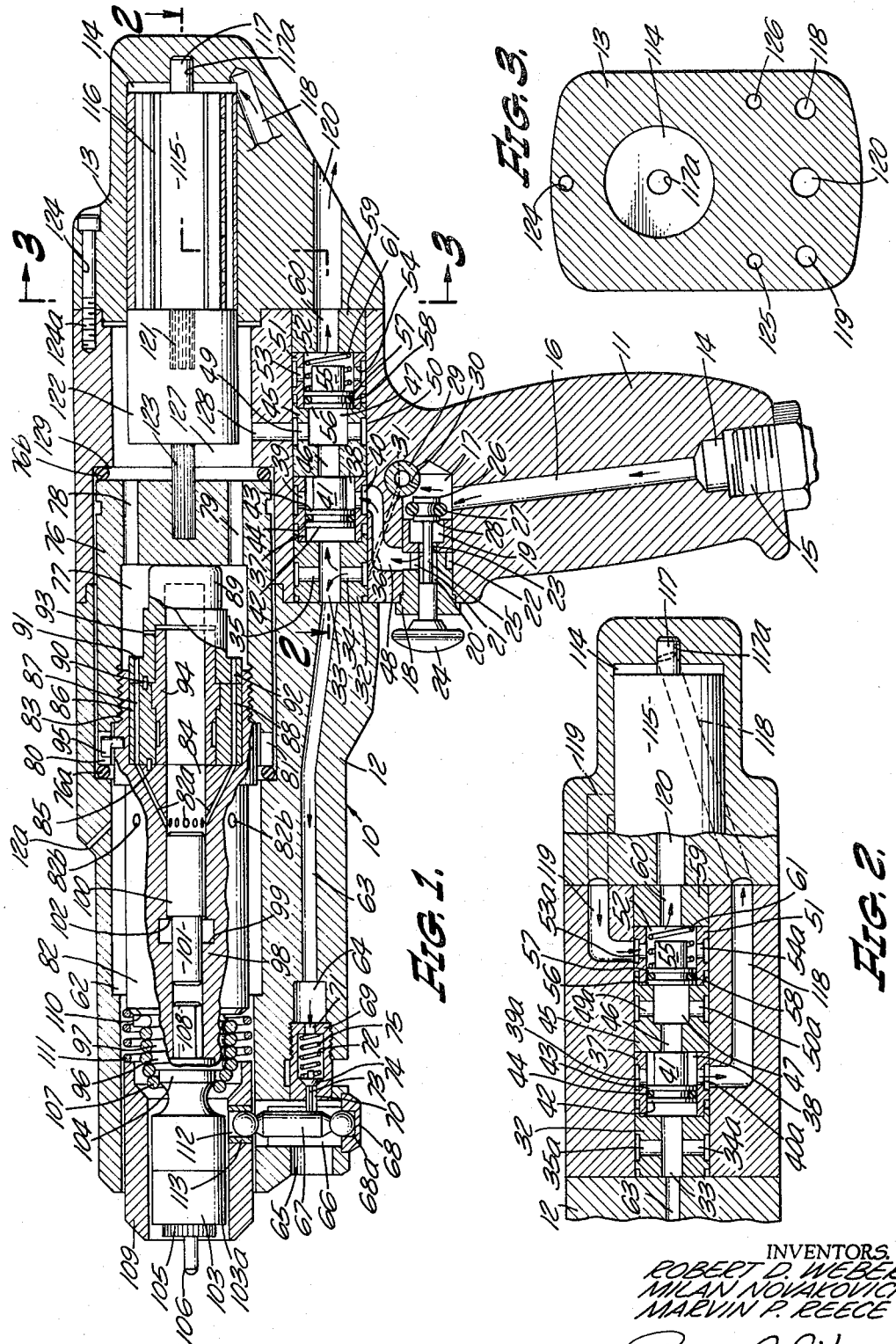

United States Patent Office 3,385,378
Patented May 28, 1968

3,385,378
AUTOMATIC AIR OPERATED
INSTALLATION GUN
Robert D. Weber, 1955 Irvine Ave., Costa Mesa, Calif. 92627; Milan Novakovich, 215 Apolena Ave., Balboa Island, Calif. 92662; and Marvin P. Reece, 33262 Bremerton St., Dana Point, Calif. 92629
Filed June 22, 1966, Ser. No. 559,629
20 Claims. (Cl. 173—15)

This invention relates to an automatic air operated gun for the installation of fasteners and more particularly, an automatic air operated gun which threads and locks a fastener into a workpiece.

With the advent of automation and high speed production techniques, the installation of fasteners into parts by manual means has become incompatible with these techniques and economy. This is particularly true in the use of inserts which require multiple step installation, i.e., threading the insert into a workpiece and thereafter locking the same therein by swaging the head thereof or displacing a coacting locking ring associated therewith. Further, manually installing an insert often times requires two separate tools, one for each installation step. The installation time of a fastener by manual means as well as the inherent inconsistencies of installation time due to the human element of manual procedure, tend to be costly and very unsatisfactory.

The device of the instant invention is an automatic air operated installation gun which will not only precisely and uniformly thread an insert into a workpiece, but also lock the fastener into the workpiece by either expanding the head thereof into the workpiece as is common in thin-walled fasteners, or by displacing a coacting locking means associated therewith such as pins, keys or serrated rings. The tool of this invention performs the aforesaid function of threading and locking the fastener in a workpiece in rapid, successive steps, thereby reducing the installation time to a minimum and the efficiency to a maximum level. In addition, the tool of this invention is completely powered by compressed air and requires no extraneous source of power for its operation.

Accordingly, the object of this invention is to provide a gun which can, in rapid, successive steps, thread and lock a fastener into a workpiece.

Another object of this invention is to provide a gun for the installation of fasteners which is operated by air pressure alone.

Other objects and advantages of the invention will become apparent from the description of the accompanying drawings in which:

FIG. 1 is a side view, in section, showing the position of the gun elements during the operation of threading the fastener into a workpiece.

FIG. 2 is a top view, in section, taken on the line 2—2 of FIG. 1.

FIG. 3 is a cross sectional view, in section, taken on the line 3—3 of FIG. 1.

FIG. 4 is a side view, in section, of the gun of FIG. 1, but showing the elements thereof in position during the locking phase of the installation operation.

FIG. 5 is a top sectioned view taken on the line 5—5 of FIG. 4, and

FIG. 6 illustrates a greatly enlarged form of another tool which can be utilized with the gun of FIGS. 1-5.

Referring more particularly to FIGS. 1-5, reference numeral 10 designates generally the gun of the invention which is basically composed of a handle housing 11, a barrel housing 12 and a motor housing 13. Handle housing 11 is provided with an air inlet bushing 15 which is accommodated in air inlet port 14; said bushing 15 being adapted for connection to an extraneous air supply for operation of the gun. Air passageway 16 interconnects air inlet port 14 and air chamber 17. Opening onto air chamber 17 is a valve housing 18 which is provided with an open chamber 19, air channel 20 and port openings 21 and 22 opening onto said air channel 20. Although only two port openings are illustrated, it is understood that a greater number of port openings may be utilized without deviating from the principles of the invention herein. Open chamber 19 is interconnected with air channel 20 by passageway 23. The front portion of valve housing 18 acts as a bushing for valve button (trigger) 24.

A throttle valve 25 secured to valve button 24 is accommodated in air channel 20, and is provided with flanges 26 and 28 and O-ring seal 27 which is adapted to close open chamber 19 of valve housing 18. Throttle valve 25 is returned to its closed position upon release of pressure to valve button 24 by the air pressure from the air supply. Also opening onto air chamber 17 is restrictor valve 29 which is provided with orifices 30 and 31. Rigidly mounted within handle housing 11 is a front cap 32 which has an axial cavity 33 passing therethrough and vertical orifice openings 34 and 35 and horizontal orifice openings 34a and 35a (as best seen in FIG. 2) intersecting said axial cavity 33. Bleeder passageway 36 intersects orifice opening 34 and restrictor valve orifice 31.

Abutting against the rearward portion of front cap 32, and in axial alignment therewith, is rigidly secured sleeve 37 which also has an axial air cavity 38 and vertical orifice openings 39 and 40 and horizontal orifice openings 39a and 40a (as best seen in FIG. 2). Slidably mounted within axial air cavity 38 of sleeve 37 is piston 41 provided with a pair of flanges 42 and 43 for accommodating O-ring 44 interposed therebetween so as to provide an air tight piston head. At its maximum forward position, piston 41 abuts against the rearward end of front cap 32 and opens the forward opening of axial cavity 46 of said spacer 45. At its maximum rearward position, piston 41 will abut against spacer 45 securely positioned in axial alignment therewith so as to seal off axial cavity 46 provided by spacer 45. It should be noted that even at the maximum rearward position of piston 41, orifice openings 39 and 40 of sleeve 37 are rearwardly of flange 43. Interconnecting orifice opening 40 of sleeve 37 and port opening 21 of valve housing 18, is air passageway 48.

In addition to axial cavity 46, spacer 45 is also provided with an enlarged axial cavity 47 and vertical orifice openings 49 and 50, and horizontal orifice openings 49a and 50a (as best seen in FIG. 2).

Abutting against the rearward end of spacer 45 is a second sleeve 51 substantially identical to sleeve 37. Sleeve 51 is provided with an axial cavity 52 and vertical orifice openings 53 and 54 and horizontal orifice openings 53a and 54a (as best seen in FIG. 2). Contained within said axial cavity 52 is piston 55 which is provided with a pair of radial flanges 56 and 57 and an O-ring 58. As was the case with piston 41, flanges 56 and 57 together with O-ring 58 form an air tight piston head. Exhaust cap 59 which is provided with an axial cavity 60 is rigidly positioned between sleeve 51 and the body of motor housing 13.

Although piston 55 is shown maintained at its maximum forward position so as to open axial cavity 60 of exhaust cap 59 by compression spring 61 which is accommodated between the rearward surface of flange 57 and the forwardly surface of exhaust cap 59, piston 55 may be maintained in this position due only to pressure from the exhaust air passing into sleeve 51. When piston 55 is at its maximum rearward position, said piston will abut against the forward end of exhaust cap 59 and overlie axial cavity 60 so as to close off the same.

In any event, it will again be noted that when piston 55 is at its maximum rearward position, orifice openings 53 and 54 are rearwardly of flange 7.

Handle housing 11 is also provided with a large cavity 127 extending therethrough so that when barrel housing 12 and motor housing 13 are attached to the forward and rearward ends thereto, respectively, an enclosed air chamber is formed about planet gear means 122. Orifice channel 128 interconnects air cavity 127 and orifice opening 49 provided by spacer 45. Cavity 127 is provided with an internal annular shoulder 129.

Secured to handle housing 11 by conventional bolt means (not shown) is barrel housing 12 which is provided with a large cavity 62 extending throughout its length and an air passageway 63. Passageway 63 interconnects orifice channel 64 and axial cavity 33 of front cap 32. Barrel housing 12 is also provided with orifice opening 65 which is normally intersected by channel 66. Pivot lever 67 which is accommodated in channel 66 is maintained in its position normal to opening 65 by lever guide 68 secured to barrel housing 12 by a screw or the like. The fulcrum end of pivot lever 67 is accommodated in cavity 68a of lever guide 68. Disposed between orifice channel 64 and opening 65 and rigidly secured to barrel housing 12 is valve body 69. Valve body 69 is provided with orifice opening 70 at its forward end and orifice opening 71 at its rearward end which are interconnected by interior cavity 72.

Valve push rod 73 is slidably positioned in orifice 70 of valve body 69 and is provided with a frusto-conical valve head 74. Valve push rod 73 is maintained in constant engagement with pivot lever 67 by a coil compression spring 75 which is positioned between the rearward surface of frusto-conical valve head 74 and the rearward wall of interior cavity 72. In this position, frusto-conical valve head 74 closes forward orifice opening 70.

Positioned within cavity 62 of barrel housing 12 is a cylindrical hammer sleeve 76 which is provided with an internal axial cavity 77. Hammer sleeve 76 is provided with a plurality of air vent channels 78 and 79 at its rearward end which open onto internal axial cavity 77 and the exterior of hammer sleeve 76. The opposite end of hammer sleeve 76 is provided with a plurality of longitudinal slots 80 and 81, the purpose of which will be hereinafter more fully described. Although only end slots 80 and 81 are described, it should be noted that the number of end slots may be increased without deviating from the principles of the invention. An increased number of end slots would insure that when hammer sleeve 76 is fully threaded onto hammer barrel 82, laterally projecting key pin 95 carried by hammer barrel 82 will be engaged by an end slot of said hammer sleeve 76.

An O-ring 76a is snugly accommodated between the slotted end of hammer sleeve 76 and barrel housing 12 and a second O-ring 76b is accommodated between the rearward end of said hammer sleeve 76 and internal annular shoulder 129 contained in cavity 127 of handle housing 11. These O-rings act as shock absorbing elements.

Also positioned within cavity 62 is cylindrical hammer barrel 82 which is threadedly engaged with hammer sleeve 76 as at 83, and is provided with an internal axial cavity 84 which is preferably hexagonal in configuration at its forward end. A plurality of air channels 82a open onto said axial cavity 84 and the rearward end of hammer barrel 82. It should be noted that said channels 82a open onto axial cavity 84 at a point rearwardly of plunger 100 so that the force exerted by the air is contained in the axial cavity 84 rearwardly of plunger 100 thereby exerting said air pressure against said plunger in a forwardly direction.

Secured to the rearward end of hammer barrel 82 by pin 85 is air cylinder front 86 which is positioned in axial cavity 77 of hammer sleeve 76. Air cylinder front 86 is provided with a plurality of air ducts 87 and 88 extending longitudinally therethrough and interconnecting air channels 82a of hammer barrel 82. Again, although two air ducts 87 and 88 are shown, any number can be utilized without deviating from the principles of the invention herein. Air cylinder front 86 is abuttingly connected to air cylinder back 89 by pin 90. Air cylinder back 89 is provided with air ducts 91 and 92 which are in longitudinal alignment with air ducts 87 and 88, respectively, of air cylinder front 86. Air cylinder back 89 is further provided with air vent 93 to permit air leakage from axial cavity 84 of hammer barrel 82. Snugly accommodated within air cylinder front 86 and air cylinder back 89 is air cylinder sleeve 94. Air cylinder sleeve 94 and air cylinder front 86 abut against the rearward surface of hammer barrel 82.

Hammer barrel 82 is provided at its forward end 96 with a helical groove 97. Hammer barrel 82 is also provided with an internal annular flange 98 so as to reduce the diameter of cavity 84 and form an annular shoulder 99. In loose slidable engagement with internal axial cavity 84 of hammer barrel 82 is a free floating plunger 100. Plunger 100 has a reduced diameter portion 101 which is adapted to be accommodated in the restricted portion of axial cavity 84 and an annular shoulder 102. Annular shoulder 99 of hammer barrel 82 restricts the forward motion of said plunger 100 by engaging shoulder 102 thereof in the event a tool such as 103 is not secured to the forward end of the hammer barrel 82.

A tool body 103 is provided with a reduced portion 104 at one end thereof, a longitudinally serrated cylindrical projection 105 and cylindrical elongation 106 slidably accommodated therein. Immediately adjacent the rearward end of longitudinally serrated portion 105 is a radial impact shoulder 103a provided by tool body 103. Reduced portion 104 is interconnected with helically grooved portion 97 of hammer barrel 82 by a coil retention spring 107. Reduced portion 104 is provided with a further reduced axial projection portion 108 which is preferably hexagonal in cross-section so as to be accommodated by the hexagonal portion of internal cavity 84 of hammer barrel 82. The rearward end of projection portion 108 is adapted to abut against reduced diameter portion 101 of plunger 100 when said plunger is reciprocating during its hammering operation as will hereafter be more fully described. It should be noted that the distance between the rearward end of projection portion 108 and internal annular shoulder 99 of hammer barrel 82 is less than the distance between the most forwardly end of reduced diameter portion 101 and annular shoulder 102 of plunger 100 so that the reciprocating motion of plunger 100 during the hammering operation is not restricted by the contact of shoulder 99 of hammer barrel 82 with shoulder 102 of plunger 100.

Encompassing tool body 103 is actuator sleeve 109 which is snugly accommodated within cavity 62 of barrel housing 12. Interposed between, and in abutting engagement with, the rearward end of actuator sleeve 109 and the external shoulder 110 of hammer barrel 82 is compression coil spring 111. Coil spring 111 permits actuator sleeve 109 to be displaced rearwardly and thereafter returns the same to its original position. Actuator sleeve 109 is provided with opening 112 having an insert 113 positioned therein. Insert 113 is adapted to accommodate the end of pivot lever 67 which is opposite to the fulcrum end thereof.

Motor housing 13 is secured to barrel housing 12 by conventional bolt means such as 124a through bolt apertures 124, 125 and 126 (as best seen in FIG. 3). Contained in cavity 114 of motor housing 13 is a cylindrical air motor 115 having a plurality of longitudinal vanes 116 radially projecting in spaced alignment thereabout. Air motor 115 is attached to said motor housing 13 by pivot means 117 which is accommodated in pivot cavity 117a of said motor housing.

Interconnecting motor housing cavity 114 and horizontal orifice opening 40a of sleeve 47 is air passageway 118, which conducts air from air passageway 48 through axial air cavity 38 into the motor housing cavity 114 during the fastener threading operation. Also interconnecting motor housing cavity 114 and horizontal orifice opening 53a is air passageway 119. Passageway 119 conducts the exhaust air from motor housing cavity 114 into axial cavity 52 of sleeve 51 and subsequently through axial cavity 60 of exhaust cap 59 into exhaust passageway 120, and thus to the atmosphere outside motor housing 13. Exhaust passageway 120 which passes through motor housing 13 interconnects axial cavity 60 of exhaust cap 59 and the atmosphere exteriorly of motor housing 13.

Axially projecting from the forward end of air motor 115 is splined spindle 121. Splined spindle 121 interconnects air motor 115 and the rearward end of planet gear means 122. Axially positioned at the forward end of said planet gear means 122 is splined spindle 123 which is interconnected with the rearward end of hammer sleeve 76. The planet gear means 122 act as reducing gear means so that the rotational speed of hammer sleeve 76 is substantially less than the rotational speed of air motor 115.

It is evident from the foregoing description that as air motor 115 rotates, planet gear means 122 and hammer sleeve 76 will be simultaneously rotated. In addition, it is obvious that since hammer barrel 82 and tool body 103 secured thereto, are engaged with said hammer sleeve 76 by key pin 95, the air motor, planet gear, hammer sleeve, hammer barrel and tool body all simultaneously rotate as a unit.

The operation of the gun of the instant invention will now be described.

Referring again to FIGS. 1 and 2, air furnished by an extraneous air source enters handle housing 11 through air passageway 16 into air chamber 17 upon the application of an inward force to valve button 24. Throttle valve 25 is depressed inwardly so that O-ring seal 27 is moved away from open chamber 19, thereby permitting the air to enter said chamber 19 and into air channel 20 through passageway 23. The air then passes into air passageway 48 and subsequently into axial air cavity 38 in sleeve 37 through vertical orifice 40 thereof. From axial air cavity 38 the air then proceeds through horizontal orifice opening 40a into air passageway 118 (see FIG. 2), and through passageway 118 into motor cavity 114.

When the air comes into contact with the longitudinal vanes 116 of air motor 115, the latter is rotated at a high rate of speed. The air then exists from motor cavity 114 through air passageway 119 (see FIG. 2) into axial cavity 52 of sleeve 51 and through horizontal orifice opening 53a thereof. The air will then pass through axial cavity 60 of exhaust cap 59 and through exhaust passageway 120 into the atmosphere outside the gun.

Since air motor 115 is connected to planet gear 122, and planet gear 122 is in turn connected to hammer sleeve 76, the latter two elements will rotate simultaneously with the air motor. As hereinabove mentioned, since the planet gear is interconnected to hammer sleeve 76, hammer barrel 82 which is in engagement with hammer sleeve 76 by key pin 95, is concomitantly rotated, thereby rotating tool body 103 which is secured to said hammer barrel 82 by coil retention spring 107. Thus, the longitudinally serrated cylindrical projection 105 and its attendant cylindrical elongation 106 will thread a fastener attached thereto into a bore in a workpiece.

Simultaneously with the foregoing action, a portion of the air which has entered air chamber 17 through air passageway 16 of handle housing 11, enters orifice 30 of restrictor valve 29. This air is then exited through restrictor valve 29 into bleeder passageway 36. Since bleeder passageway 36 intersects vertical orifice opening 34 of front cap 32, the air will then pass into axial cavity 33 of said front cap 32 thereby maintaining piston 41 at its most rearward position. When piston 41 is at its most rearward position it closes the opening to axial cavity 46, thereby prohibiting the air from passing into the spacer 45 and to piston 55 contained in the second sleeve 51. The air which has entered axial cavity 33 of front cap 32 will also pass into air passageway 63 of barrel housing 12 and subsequently into orifice channel 64 and interior cavity 72 of valve body 69. Since coil compression spring 75 maintains frusto-conical valve head 74 in a closed position, the air in air passageway 63 is not permitted to escape to the atmosphere.

When the fastener is threaded to its appropriate depth and actuator sleeve 109 comes into contact with the workpiece surface, said actuator sleeve is displaced inwardly into barrel housing 12 thereby rearwardly displacing the nonfulcrumed end of pivot lever 67. The movement of pivot lever 67 rearwardly exerts a force against valve push rod 73 and concomitantly frusto-conical valve head 74, so as to open the same. (See FIGS. 4 and 5.) The air which has been maintained in air passageway 63 and interior cavity 72 of valve body 69 is thus allowed to escape through orifice opening 70 into the atmosphere, causing a drop in air pressure forwardly of piston 41 in sleeve 37. Because of the air which is being continuously supplied to axial air cavity 38 rearwardly of flange 43 of piston 41, said piston is moved forwardly away from the opening of axial cavity 46. Air will then pass through axial cavity 46 and enlarged axial cavity 47 through vertical orifice opening 49 into orifice channel 128 and subsequently air chamber 127. The air entering enlarged axial cavity 47 will exert a force against piston 55 so that the latter is displaced to its most rearward position, closing the opening to axial cavity 60 of exhaust cap 59. This will prohibit the air from the motor cavity 114 from exhausting through exhaust passageway 120 and will cause air motor 115 to cease rotating.

The air which has passed into air chamber 128 surrounding planet gear means 122 will pass through air vent channels 78 and 79 in the rearward portion of hammer sleeve 76 into axial cavity 77. From axial cavity 77 the air then passes into air ducts 91 and 92 provided by the annular flange of air cylinder back 89 and through air ducts 87 and 88, respectively, provided by air cylinder front 86. Thereafter, the air will pass through air passageway 82a in hammer barrel 82 into the internal axial cavity 84 of said hammer barrel.

The air which enters into axial cavity 84 will exert a force against the rearward surface of plunger 100 causing the latter to be forwardly displaced so that the reduced diameter portion 101 thereof comes into contact with reduced axial projection portion 108 of tool body 103. The force of the impact of plunger 100 against axial projection portion of tool body 103 will cause impact shoulder 103a to pound against the locking means of the fastener and also cause the free floating plunger 100 to recoil in a rearwardly direction. The air pressure which is constantly present will again displace plunger 100 forwardly so as to impact against projection portion 108 of tool body 103.

Again, due to the force of the aforesaid impact, plunger 100 is caused to recoil in a rearwardly direction. The plunger continues this reciprocating action (as is designated by double-headed arrow A in FIG. 4), thereby displacing the locking means of the fastener into its locking position. It should be noted that a portion of the air in axial cavity 84 is eliminated through exhaust ports 82b into cavity 62 of barrel housing 12 and subsequently into the atmosphere outside the gun through air vent 12a. The elimination of a portion of the air as aforesaid, is necessary to permit plunger 100 to reciprocate in a rearward direction. The absence of these exhaust ports and the air vent could prevent the reciprocation of plunger 100 due to air pressure buildup in axial cavity 84.

When the fastener is satisfactorily locked into the workpiece, valve button 24 is released. The air which is continuously entering air passageway 16 of handle housing 11 will exert a force against flange 26 and O-ring seal 27 carried by throttle valve 25, thereby displacing the same forwardly. Thus, O-ring seal 27 closes open chamber 19 and prohibits air from entering air passageway 48 and subsequently axial cavity 84 of hammer barrel 82 so as to terminate the reciprocating action of plunger 100.

FIG. 6 illustrates another configuration of an installation tool wherein the tool body 103 is provided with a cylindrical swaging element 105a instead of serrated projection 105 as shown in FIGS. 1 and 4, and wherein axial cylindrical projection 106 is an axial projection 106a having a hexagonal cross sectional configuration. This type of tool may be utilized for installing thin walled inserts which are provided with swageable heads that are outwardly expanded in a bore in a workpiece so as to lock the fastener in said workpiece. When the alternate tool, as illustrated in FIG. 6, is utilized with the gun of this invention the annular shoulder 130 will come into contact with the head of the fastener rather than impact shoulder 103a of tool body 103, due to the reciprocating action of plunger 100.

While several embodiments of the invention have been described, it is, of course, understood that the particular embodiments of the invention herein disclosed are for illustrative purposes only and that various changes may be made therein without departing from the principles of the invention or the scope of the annexed claims.

We claim:

1. An air operated installation gun, comprising:
   a body, said body being provided with a plurality of elongated internal cavities;
   hammer means positioned within one of said elongated cavities for providing a reciprocating force;
   air cylinder means secured to said hammer means for providing air pressure to said hammer means;
   tool means attached to said hammer means for accommodation of a fastener or the like;
   sleeve means secured to said hammer means for enclosing said air cylinder means;
   means for conducting air from said sleeve means enclosure to the atmosphere exteriorly thereof;
   gear means connected to said sleeve means for controlling the rotational speed of said hammer means;
   air motor means rotatably attached to said body and connected to said gear means for providing rotational movement thereto;
   a first air valve relay means for controlling air to said air motor means and controlling air to a second air valve relay;
   means for conducting air from said first air valve relay means to said air motor means;
   a second air valve relay means for controlling exhaust air from said air motor means and controlling air to said air cylinder means;
   means for conducting air from said air motor means to said second air valve relay means;
   means for conducting air from said second air valve relay means to said air cylinder means;
   means for conducting air from said second air valve relay means to the atmosphere exteriorly of said body;
   relief valve means for controlling said first air valve relay means;
   actuator means for activating said relief valve means;
   throttle valve means for controlling air movement to said first air valve relay means;
   means for conducting air from said throttle valve means to said first air valve relay means;
   means for providing an air supply to said throttle valve means; and
   bleeder means for interconnecting said first air valve relay means and said air supply means to permit a limited constant air supply to said first air valve means.

2. An air operated installation gun as described in claim 1 wherein said sleeve means is positioned within said body cavity, said sleeve means having an axial cavity extending partially therethrough, said sleeve means having air duct means connecting said axial cavity thereof and the atmosphere exteriorly of said sleeve means.

3. An air operated installation gun as described in claim 1 wherein said gear means is positioned within said body cavity and are reducing gear means for reducing the rotational speed transmitted from the air motor means to the sleeve means.

4. An air operated installation gun as described in claim 1 wherein said air motor means is positioned within said body cavity, said air motor means having a plurality of radially spaced, longitudinally extending vanes laterally projecting therefrom.

5. An air operated installation gun as described in claim 1 wherein said relief means is secured to said body and is comprised of a valve body having an interior cavity and a plurality of orifices interconnecting the internal cavity thereof and the atmosphere exteriorly of said valve body, a valve push rod having a frusto-conical valve head secured thereto positioned in one of said orifices and a coil compression spring positioned within said internal cavity in abutting engagement between the frusto-conical valve head and the opposite interior wall of the internal cavity, and at least one air duct interconnecting at least one of said orifices with said first air valve relay means.

6. An air operated installation gun as described in claim 1 wherein said actuator means is positioned in the same body cavity as the hammer means and is comprised of a hollow sleeve engaged with a pivot lever means pivotally connected to said body, said pivot lever means being engaged by said relief valve means.

7. An air operated installation gun as described in claim 1 wherein said throttle valve means is positioned in a third body cavity, said throttle valve means being comprised of a hollow valve housing having a stem passing therethrough provided with a trigger on the external end thereof and closure means on the internal end thereof, said valve housing being provided with at least one air duct interconnecting the cavity therein and the external surface thereof.

8. An air operated installation gun as described in claim 1 wherein said hammer means is provided with an axial cavity extending therethrough, said hammer means having air duct means for receiving air and air duct means for exhausting air interconnecting the axial cavity of said hammer means and the atmosphere exteriorly thereof, said hammer means having a plunger slidably positioned within the axial cavity thereof.

9. An air operated installation gun as described in claim 8 wherein said air cylinder means is provided with air ducts passing therethrough interconnecting said air ducts for receiving air carried by said hammer means and the enclosure formed by said sleeve means.

10. An air operated installation gun as described in claim 8 wherein said tool means is removably attached to said hammer means and partially positioned within said body cavity, said tool means having an anvil means secured thereto faced toward said hammer means, and fastener accommodating means secured to the opposite end thereof.

11. An air operated installation gun as described in claim 1 wherein said first air valve relay means is comprised of a front cap positioned within a second body cavity, said cap having a channel passing therethrough extending longitudinally to the axis of said cap, said cap being provided with an air duct interconnecting said longitudinal channel and the exterior surface of said cap, a hollow first piston sleeve contained in said second body cavity, said piston sleeve being in abutting engagement with said front cap and having the cavity thereof aligned with said cap channel, said first piston sleeve having a plurality of air ducts interconnecting the cavity therein and the external surface thereof, a first piston element contained in said first piston sleeve in slidable engagement therewith, said piston element having a body provided with a piston head secured thereto, and wherein said second air valve relay means is comprised of a spacer contained in said second body cavity in abutting alignment with said first piston sleeve, said spacer having a channel extending therethrough longitudinally to the axis thereof, said spacer channel being in alignment with the cavity of said first piston sleeve, said spacer having a plurality of air ducts interconnecting the channel therein and the surface exteriorly thereof, a hollow second piston sleeve contained in said second body cavity in abutting alignment with said spacer and having the cavity thereof aligned with the channel of said spacer, said second piston sleeve having a plurality of air ducts interconnecting the cavity therein and the external surface thereof, a second piston element contained with said second piston sleeve in slidable engagement therewith, said piston element having a body provided with a piston head secured thereto, an exhaust cap contained in said second body cavity in abutting alignment with said second piston sleeve, said exhaust cap having a channel extending therethrough longitudinally to the axis thereof, said exhaust cap channel being aligned with the cavity of said second piston sleeve, and spring means positioned between the head of said second piston element and said exhaust cap for disengaging said second piston element from overlying closure of said exhaust cap channel.

12. An air operated installation gun as described in claim 11 wherein said means for conducting air from said sleeve means enclosure to the atmosphere exteriorly thereof is comprised of a plurality of air passageways interconnecting the sleeve means enclosure and the atmosphere exteriorly thereof.

13. An air operated installation gun as described in claim 11 wherein said means for conducting air from said first air valve relay means to said air motor means is comprised of at least one air passageway interconnecting at least one of the air ducts of said first piston sleeve and the body cavity surrounding the air motor means.

14. An air operated installation gun as described in claim 11 wherein said means for conducting air from said air motor means to said second air valve relay means is comprised of at least one air passageway interconnecting the body cavity surrounding the air motor means and at least one of said air ducts of said second piston sleeve.

15. An air operated installation gun as described in claim 11 wherein said means for conducting air from said second air valve relay means to said air cylinder means is comprised of at least one air passageway interconnecting at least one of the air ducts of said spacer and said body cavity surrounding the gear means.

16. An air operated installation gun as described in claim 11 wherein the means for conducting air from said second air valve relay means to the atmosphere exteriorly of said body is comprised of at least one air passageway interconnecting the channel of said exhaust cap and the atmosphere exteriorly of said body housing.

17. An air operated installation gun as described in claim 11 wherein the means for conducting air from said throttle valve means to said first air valve relay means is comprised of at least one air passageway interconnecting at least one of the air ducts of said first piston sleeve and said throttle valve means.

18. An air operated installation gun, comprising:
a body housing, said body housing having a plurality of elongated cavities therein, said body housing being provided with an air duct interconnecting a first body cavity and the atmosphere exteriorly of said body housing;
an air motor positioned within said first body cavity and rotatably secured thereto, said air motor having a plurality of radially spaced, longitudinally extending vanes laterally projecting therefrom;
reducing gear means positioned in said first body cavity interconnected with said motor means;
sleeve means positioned in said first body cavity connected to said gear means, said sleeve means having an axial cavity extending partially therethrough, said sleeve means having air duct means connecting said axial cavity thereof and the atmosphere exteriorly of said sleeve means;
hammer means secured to said sleeve means, said hammer means being provided with an axial cavity extending therethrough, said hammer means having air duct means for receiving air and air duct means for exhausting air interconnecting the axial cavity of said hammer means and the atmosphere exteriorly thereof;
air cylinder means secured to said hammer means, said air cylinder means having air ducts passing therethrough interconnecting said air duct means for receiving air carried by said hammer means and the axial cavity of said sleeve means;
tool means positioned within said first body cavity removably attached to said hammer means, said tool means having an anvil means secured thereto facing toward said hammer means, and fastener accommodating means secured to the opposite end thereof;
plunger means slidably positioned within the axial cavity of said hammer means for impact engagement with said anvil means;
a front cap positioned within a second body cavity, said cap having a channel passing therethrough extending longitudinally to the axis of said cap, said cap being provided with an air duct interconnecting said longitudinal channel and the exterior surface of said cap;
a hollow first piston sleeve contained in said second body cavity, said piston sleeve being in abutting engagement with said front cap and having the cavity thereof aligned with said cap channel, said first pisto sleeve having a plurality of air ducts interconnecting the cavity therein and the external surface thereof;
a first piston element contained in said first piston sleeve in slidable engagement therewith, said piston element having a body provided with a piston head secured thereto;
an air pasageway interconnecting at least one of the air ducts of said first sleeve and said first body cavity surrounding the air motor;
a spacer contained in said second body cavity in abutting alignment with said first piston sleeve, said spacer having a channel extending therethrough longitudinally to the axis thereof, said spacer channel being in alignment with the cavity of said first piston sleeve, said spacer having a plurality of air ducts interconnecting the channel therein and the surface exteriorly thereof;
an air passageway interconnecting at least one of the air ducts of said spacer and said first body cavity surrounding the gear means;
a hollow second piston sleeve contained in said second body cavity in abutting alignment with said spacer and having the cavity thereof aligned with the channel of said spacer, said second piston sleeve having a plurality of air ducts interconnecting the cavity therein and the external surface thereof;
an air pasageway interconnecting said first body cavity surrounding the air motor and at least one of said air ducts of said second piston sleeve;
a second piston element contained within said second piston sleeve in slidable engagement therewith, said piston element having a body provided with a piston head secured thereto;
an exhaust cap contained in said second body cavity in abutting alignment with said second piston sleeve, said exhaust cap having a channel extending therethrough longitudinally to the axis thereof, said exhaust cap channel being aligned with the cavity of said second piston sleeve;

spring means positioned between the head of said second piston element and said exhaust cap for disengaging said second piston element from overlying closure of said exhaust cap channel;

an air passageway interconnecting the channel of said exhaust cap and the atmosphere exteriorly of said body housing;

relief valve means secured to said body housing for controlling air to said front cap and said first piston sleeve;

an air passageway interconnecting said relief valve means and said front cap channel;

pivot lever means pivotally connected to said body housing engaged by said relief valve means;

actuator means positioned within said first body cavity engaged with said pivot lever means for pivotally activating the same;

throttle valve means positioned in a third body cavity, said throttle valve means comprised of a hollow valve housing having a stem passing therethrough provided with a trigger on the external end thereof and closure means on the internal end thereof, said valve housing being provided with an air duct interconnecting the cavity therein and the external surface thereof;

bleeder means positioned in said third body cavity, said bleeder means having air intake and air exhaust ports for providing a limited constant air supply to said front cap;

an air passageway interconnecting the exhaust port of said bleeder means and at least one of the air ducts of said front cap;

an air passageway interconnecting the air duct of said valve housing and at least one of the air ducts of said first piston sleeve; and air channel means for interconnecting said third body cavity and an air supply source.

19. In an air operated installation gun, a valve relay system, comprising:
a first air valve relay means for conducting air to an air motor means and controlling air to a second air valve relay, said first air valve relay means comprised of a front cap provided with air ducts for receiving and exhausting air, and a first piston sleeve provided with air ducts for receiving and exhausting air, in abutting alignment with said front cap so that at least one air duct of said first piston sleeve is aligned with at least one air duct of said front cap, said first piston sleeve having a piston slidably contained therein;

a second air valve relay means for controlling exhaust air from said air motor means and conducting air to an air cylinder means, said second air valve relay means comprised of a spacer provided with air ducts for receiving and exhausting air, said spacer being in abutting alignment with said first piston sleeve so that at least one air duct of said spacer is aligned with at least one air duct of said first piston sleeve, a second piston sleeve provided with air ducts for receiving and exhausting air, in abutting alignment with said spacer so that at least one air duct of said second piston sleeve is aligned with at least one air duct of said spacer, said second piston sleeve having a piston slidably contained therein; and an exhaust cap in abutting alignment with said second piston sleeve, said exhaust cap having air duct means passing therethrough, aligned with at least one air duct of said second piston sleeve.

20. In an air operated installation gun as described in claim 19 wherein said first and second piston sleeves are hollow and the pistons are contained within the respective cavities thereof, said pistons are each provided with a body having a piston head secured thereto, said front cap and spacer have at least one of said air ducts thereof extending longitudinally therethrough relative to the axis thereof, the longitudinally extending air ducts of the front cap being aligned with the cavity of the first piston sleeve, the longitudinally extending air ducts of the spacer being simultaneously aligned with cavities of the first and second piston sleeves, and the cavity of the second piston sleeve being aligned with the air duct means of the exhaust cap.

References Cited

UNITED STATES PATENTS

| | | | |
|---|---|---|---|
| 1,517,503 | 12/1924 | Hansen | 173—105 X |
| 2,403,675 | 7/1946 | Mitchell | 173—107 X |
| 2,518,049 | 8/1950 | Mosier | 173—15 |
| 2,824,547 | 2/1958 | Sherrill | 173—106 |

CHARLES E. O'CONNELL, *Primary Examiner.*

DAVID H. BROWN, *Examiner.*